United States Patent
Prakash et al.

(10) Patent No.: US 8,566,938 B1
(45) Date of Patent: Oct. 22, 2013

(54) SYSTEM AND METHOD FOR ELECTRONIC MESSAGE ANALYSIS FOR PHISHING DETECTION

(71) Applicant: Astra Identity, Inc., Acton, MA (US)

(72) Inventors: Gagan Prakash, Acton, MA (US); Ravi Agarwal, Grandville, MI (US)

(73) Assignee: Astra Identity, Inc., Acton, MA (US)

( * ) Notice: Subject to any disclaimer, the term of this patent is extended or adjusted under 35 U.S.C. 154(b) by 0 days.

(21) Appl. No.: 13/668,349

(22) Filed: Nov. 5, 2012

(51) Int. Cl.
*H04L 29/14* (2006.01)

(52) U.S. Cl.
USPC .............................................. 726/22; 726/26

(58) Field of Classification Search
None
See application file for complete search history.

(56) References Cited

U.S. PATENT DOCUMENTS

| | | | |
|---|---|---|---|
| 2006/0123464 A1* | 6/2006 | Goodman et al. | 726/2 |
| 2006/0168066 A1* | 7/2006 | Helsper et al. | 709/206 |
| 2007/0101423 A1* | 5/2007 | Oliver et al. | 726/22 |
| 2008/0133672 A1* | 6/2008 | Gillum | 709/206 |

OTHER PUBLICATIONS

Spoof Email Tutorial, eBay, 2006.*

* cited by examiner

*Primary Examiner* — Minh Dinh
(74) *Attorney, Agent, or Firm* — John Brooks Law LLC; John J Brooks, III

(57) ABSTRACT

A system and method for analyzing electronic messages for phishing detection are disclosed. In one example, email characteristics are obtained by parsing a received email message from a sender/sender organization to a recipient/recipient organization based on a set of predetermined email characteristics; the email characteristics of the received email message are then compared with email characteristics associated with the recipient/recipient organization and/or the sender/sender organization, and the received email message is then declared as a phishing electronic message based on the outcome of the comparison.

30 Claims, 3 Drawing Sheets

SYSTEM AND METHOD FOR ELECTRONIC MESSAGE ANALYSIS FOR PHISHING DETECTION

BACKGROUND

Existing email protocols on the Internet do not validate the identity of the sender of an email. As a result, bad actors impersonate other people's identity in order to increase the likelihood of recipients opening their messages and attachments. This activity is generally referred to as "phishing" and specifically "spear phishing" when the recipient is targeted by the fake sender who is referred to as a "phisher". By getting recipients to open these fake emails, the phishers can increase their likelihood of successfully gaining unauthorized access to confidential data, including trade secrets, state secrets, military information, and other information for a variety of motivations, especially for financial gain through fraud, identity theft and/or data theft. The senders typically target and attack multiple users at a specific organization with impersonated emails in order to gain unauthorized access to their confidential data. Once a recipient opens the fake email and sometimes the attachments, the user's computer may be infected and will be used to send out phishing emails on behalf of the phisher. Some fake emails contain links that when followed takes the user to a website, which may install malware on the recipient's computer or pose as a familiar website and ask for confidential information, such as login credentials and/or account numbers. Perpetrators may also use a compromised computer as the launch point to further penetrate the organization's computer network to access data stored on other computers, servers, and devices. Phishers may also delete and change information or even damage physical systems controlled by computers.

Existing solutions are based on checking IP address associated with the phishing email or checking the text of an email for an URL to detect whether the email is a phishing email. Further, existing solutions are not integrated into email servers and clients and therefore, are restricted to some minimal checks to detect phishing activities. These techniques seem to work only when phishers use IP addresses or URLs that are suspected to be malevolent and therefore, they are typically, not robust enough to prevent sophisticated phishing attacks.

SUMMARY

A system and method for analyzing electronic messages for phishing detection are disclosed. In one embodiment, the method includes obtaining email characteristics by parsing a received email message by a recipient/recipient organization based on a set of predetermined email characteristics. The email characteristics of the received email message are then compared with email characteristics associated with the recipient/recipient organization and/or the sender/sender organization. The received email message by the recipient/recipient organization is then declared as a phishing electronic message based on the outcome of the comparison.

In yet another embodiment, a system is disclosed. The system includes an anti-phishing server and the anti-phishing server includes a processor and memory and wherein the memory includes an anti-phishing module, wherein the anti-phishing module comprises an import module, an analysis and data warehouse module, a mail handler module, an organizational analysis module, an outbound mail relay module, a configuration and management module that are configured to receive an email message by one or more recipients/recipient's organizations from one or more senders/sender's organizations via the mail handler module. Further configured to obtain email characteristics by parsing the received email message based on a set of predetermined email characteristics by the analysis and data warehouse module. Further configured to compare the email characteristics of the received email message with email characteristics associated with the recipient/recipient organization and/or the sender/sender organization by the analysis and data warehouse module. Further configured to declare the received email message by the recipient/recipient organization as a phishing electronic message based on the outcome of the comparison by the analysis and data warehouse module.

BRIEF DESCRIPTION OF THE DRAWINGS

Examples of the invention will now be described in detail with reference to the accompanying drawings, in which.

The drawings described herein are for illustration purposes only and are not intended to limit the scope of the present disclosure in any way.

DETAILED DESCRIPTION

A system and method for analyzing electronic messages for phishing detection are disclosed. In the following detailed description of the examples of the present subject matter, references are made to the accompanying drawings that form a part hereof, and in which are shown by way of illustration specific examples in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

The terms "electronic message" and "email" are used interchangeably throughout the document. Further, the term "phishing" is also referred to as "spear phishing" in the document.

Figure 1:
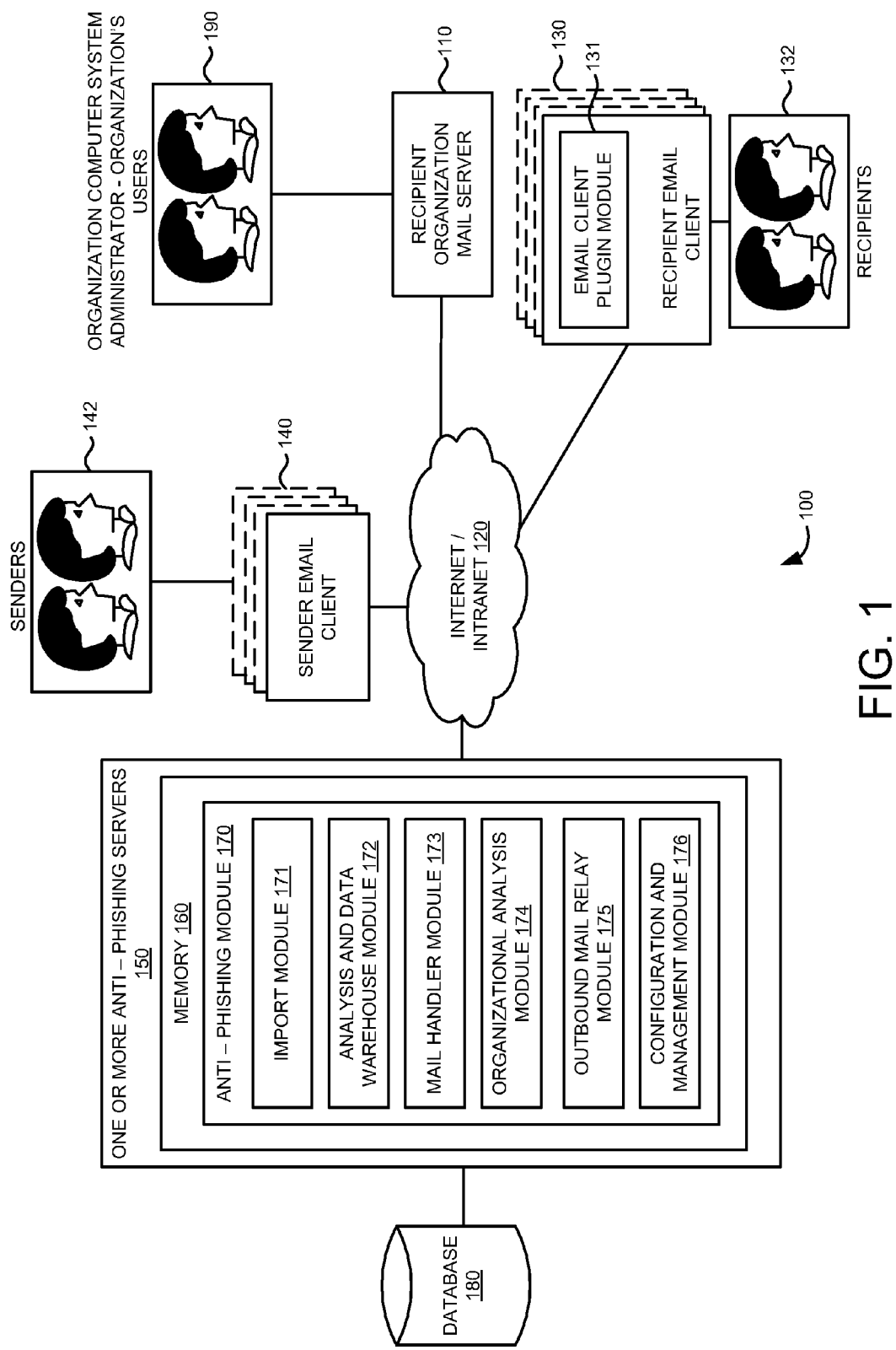
FIG. 1 illustrates an exemplary block diagram of a system for analyzing electronic messages for phishing detection.

FIG. 1 illustrates an exemplary block diagram of a system 100 for analyzing electronic messages for phishing detection. As shown in FIG. 1, the system 100 includes a recipient organization mail server 110 and its associated organization computer system administrator/organization users 190, one or more recipient email clients 130, such as desktop software, server software, mobile device software or internet browser based software such as Microsoft Outlook, Gmail and so on 130 and its associated recipients 132, and one or more sender's email clients 140 and their associated senders 141 that are coupled to one or more anti-phishing servers 150 via Internet/Intranet 120. Further as shown in FIG. 1, the one or more anti-phishing servers 150 are coupled to a database 180. Furthermore as shown in FIG. 1, the each of the one or more recipient's email client 130 includes an email client plugin module 131. In addition as shown in FIG. 1, memory 160 in each anti-phishing server 150 includes an anti-phishing module 170. The anti-phishing module 170 includes an import module 171, an analysis and data warehouse module 172, mail handler module 173, an organizational analysis module 174, an outbound mail relay module, and a configuration and management module 176.

Now, the operation of the system 100 will be described. The one or more recipients/recipient organization receives an email message from one or more senders/sender's organization via the mail handler module 173. The analysis and data warehouse module then obtain email characteristics by parsing the received email message based on a set of predetermined email characteristics.

Exemplary email characteristics are network path used to reach a recipient/recipient organization, geography associated with IP address, email client software used by the sender/sender organization, email client software version used by the sender/sender organization, date, day of week, time, time period of the email, time zone of the sender/sender organization, presence and details of digital signatures in the email, meta data present in header portion of the email, character set used in content of the email, format of the email, email length and subject length, character case of the email, character case of the subject, style of introduction at the top of the email, style and content of the sender/sender organization's signature in the body of the email, other recipient's included in the email, to, and copy circulated (cc'd) email addresses, senders name, sender's from and reply to email address, sender's organization name, senders domain name, sender's organization's Domain Name Service (DNS) settings including SPF records, sender organization's mail server information, including server ip address, sender server network path, sender email server software and software version, DKIM signature, spam scoring from spam software, message ID, volume of email sent by the sender, volume of email sent by sender's organization, volume of email received by the recipient, volume of email received by recipient organization, details associated with URLs or attachments in the email, whether the recipient/recipient organization has responded to this specific email, and number of interactions between sender/sender organization and recipient associated with the email and the like.

Further, in operation, emails received by the recipient/recipient organization over a predetermined time interval are imported by the import module 171 on its own or optionally via the email client plugin module 131. The analysis and data warehouse module 172 then parses the recipient/recipient organization's received emails based on the set of predetermined email characteristics to obtain email characteristics of the imported emails. The analysis and data warehouse module 172 then stores the obtained email characteristics associated with recipient/recipient organization and sender/sender organization in the database 180.

Furthermore, in operation, the configuration and management module is configured to allow an administrator to select desired email characteristics to be included in the set of characteristics used for comparing the characteristics of the received email message and to assign or change a weight of how much each characteristic should influence the likelihood that a new message is a phishing message.

Now, during operation, the analysis and data warehouse module 172 compares email characteristics of the received email message with email characteristics associated with the recipient/recipient organization and/or from that sender/sender organization by the analysis and data warehouse module. In some embodiments, the analysis and data warehouse module 172 obtains a statistical distribution of each of the stored email characteristics associated with the recipient/recipient organization for a sender/sender organization. The analysis and data warehouse module 172 then compares the email characteristics of the received email message with statistical distribution of each email characteristics associated with the recipient/recipient organization for that sender/sender organization.

The analysis and data warehouse module 172 then scores and declares the received email message by the recipient/recipient organization as a phishing electronic message based on the outcome of the comparison.

In some embodiments, the analysis and data warehouse module 172 determines degree of variance of each email characteristic when compared with the associated statistical distribution. The analysis and data warehouse module 172 then establishes a score based on the determined degree of variance for each email characteristic, wherein the analysis and data warehouse module 172 assigns weights for each established score based on the determined degree of variance. The analysis and data warehouse module 172 then obtains a combined score by adding scores of all the email characteristics in the received email based on the assigned weights.

In some embodiments, the analysis and data warehouse module 172 stores logs of received emails and any associated phishing activity along with details of why the email was determined to be a phishing email in the database. The configuration and management module 176 then outputs logs of received emails and any associated phishing activity for viewing on a display device.

In some embodiments, the mail handler module 173 quarantines emails determined to be phishing emails. In these embodiments, the configuration and management module 176 then outputs quarantined emails for viewing on a display device or forwards these emails to certain users or adds certain text to the header or subject of the email to mark them as suspect.

In some embodiments, either the email client plugin module 131 or the outbound mail relay module 175 parses outbound emails sent by the recipient/recipient organization based on a set of predetermined outbound email characteristics to determine if the outbound email is a response or forward of a previously received email by the recipient/recipient organization. The analysis and data warehouse module 172 then updates email characteristics of the previously received emails based on the above determination to determine that the characteristics of previously received email are more likely to represent a legitimate sender/sender organization. The analysis and data warehouse module 172 then compares ongoing emails received from the sender/sender organizations with email characteristics, and wherein the analysis and data warehouse module scores and declares any of the ongoing emails received from sender/sender organizations as phishing based on the outcome of the comparison.

In some embodiments, either the mail handler module 173 or the email client plugin module 131 includes visual identifications and reasoning information to the received email based on the outcome of the comparison to assist the recipient/recipient organization of the nature of the received email.

In some embodiments, either the email client plugin module 131 or the configuration and management module 176 obtains contact and background information from the email recipient/recipient organizations' online social networks. The analysis and data warehouse module 172 then stores the contact and background information in the database. The analysis and data ware house module 172, upon receiving an email, determines whether the contact and background information in the received email is statistically matches the stored contact and background information in the database 180. The analysis and data warehouse module 172 then scores and declares the received email as a phishing email based on the outcome of the determination.

In some embodiments, the organization analysis data warehouse module 172 determines coordinated phishing attacks against an organization by spotting phishing attacks having similar characteristics against multiple users in the organization. In some embodiments, the organization analysis module 174 monitors changing patterns of outbound emails to determine whether an organization's email client has been compromised and the sender/sender organization is sending a phishing email. In some embodiments, either the email client plugin module 131 or the configuration and management module 176 allows users to specify an email as a phishing attempt or a legitimate email and use the characteristics of this flagged email to filter messages to other users in the organization.

Now, referring to FIG. 2, a flow diagram 200 for carrying out analysis of electronic messages for phishing detection will be described. At block 210, emails received by the recipient/recipient organization over a predetermined time interval are imported.

At block 220, email characteristics of the imported emails are obtained by parsing the recipient's/recipient organization's received emails based on the set of predetermined email characteristics. Exemplary email characteristics are network path used to reach a recipient/recipient organization, geography associated with IP address, email client software used by the sender/sender organization, email client software version used by the sender/sender organization, date, day of week, time, time period of the email, time zone of the sender/sender organization, presence and details of digital signatures in the email, meta data present in header portion of the email, character set used in content of the email, format of the email, email length and subject length, character case of the email, character case of the subject, style of introduction at the top of the email, style and content of the sender/sender organization's signature in the body of the email, other recipients/recipient organizations included in the email, to, and copy circulated (cc'd) email addresses, senders name, senders from and reply to email address, senders organization name, senders domain name, sender's organization's Domain Name Service (DNS) settings including SPF records, sender organization's mail server information, including server ip address, sender server network path, sender email server software and software version, DKIM signature, spam scoring from spam software, message ID, volume of email sent by the sender, volume of email sent by sender's organization, volume of email received by the recipient, volume of email received by recipient organization, details associated with URLs or attachments in the email, whether the recipient/recipient organization has responded to this specific email, and number of interactions between sender and recipient associated with the email and the like.

At block 230, the obtained email characteristics associated with the recipient's/recipient's organization's and the sender's/sender organization's received emails are stored in a database. At block 240, an email message is received from a sender/sender organization for a recipient/recipient organization. At block 250, email characteristics are obtained by parsing the received email message based on a set of predetermined email characteristics.

At block 260, the email characteristics of the received email message are compared with the email characteristics associated with the recipient/recipient organization, and/or the sender/sender organization. In some embodiments, an administrator is allowed to select desired email characteristics to be included in the set of characteristics used for comparing the characteristics of the received email message and to assign a weight of how much each characteristic should influence the likelihood that a new message is a phishing message. Further in some embodiments, a statistical distribution of each of the stored email characteristics associated with the recipient/recipient organization and sender/sender organization is obtained. The email characteristics of the received email message are then compared with the obtained statistical distribution of prior email characteristics associated with the recipient/recipient organization and/or sender/sender organization. In some embodiments, email determined as phishing emails are flagged and may be stored for subsequent analysis in determining phishing characteristics of a received email.

At block 270, the received email message by the recipient/recipient organization is then declared as a phishing electronic message based on the outcome of the comparison.

In some embodiments, degree of variance of each email characteristic when compared with the associated statistical distribution is determined. A score based on the determined degree of variance is then established for each email characteristic. Then weights for each established score is assigned based on the determined degree of variance. A combined score is then obtained by adding scores of all the email characteristics in the received email based on the assigned weights.

In some embodiments, logs of received emails and any associated phishing activity along with details of why the email was determined to be a phishing email is stored in the database. In these embodiments, logs of received emails and any associated phishing activity are outputted for viewing on a display device.

In some embodiments, emails determined to be phishing emails are quarantined. The quarantined emails are then outputted for viewing on a display device.

In some embodiments, outbound emails sent by the recipient/recipient organization are parsed based on a set of predetermined outbound email characteristics to determine if the outbound email is a response or forward of a previously received email by the recipient/recipient organization. The database is then updated to indicate that the characteristics of the previously received email are more likely to represent a legitimate sender/sender organization. Any ongoing emails received from the sender/sender organization are then compared with stored email characteristics. Based on the outcome of the comparison, any of the ongoing emails received from the sender/sender organization are then declared as phishing emails.

In some embodiments, visual identifications and reasoning information on why the received email may be a phishing email are included based on the outcome of the comparison to assist the recipient/recipient organization of the nature of the received email.

In some embodiments, contact and background information associated with the email recipient/recipient organizations are obtained from recipient/recipient organization's Internet/online social networks. The contact and background information is then stored in the database. Upon receiving an email, correctness of the contact and background information in the received email is determined using the stored contact and background information and is used as a factor in determining if the email is a phishing attempt.

In some embodiments, coordinated phishing attacks against an organization are determined by spotting phishing attacks having similar characteristics against multiple users in the organization. In some embodiments, changing patterns of outbound emails are monitored to determine whether an email client has been compromised and the sender/sender organization is sending a phishing email. In some embodiments, users are allowed to specify an email as a phishing attempt and use the characteristics of this flagged email to filter messages to other users in the organization.

Now, referring to FIG. 3, another flow diagram 300 for carrying out analysis of electronic messages for phishing detection will be described. At block 310, outbound emails sent by the recipient/recipient organization are parsed based on a set of predetermined outbound email characteristics to determine if the outbound email is a response or forward of a previously received email by the recipient/recipient organization. At block 320, database is updated to reflect that the characteristics of the original/previous email that this new email is a reply or forward to most likely represent a legitimate sender/sender organization. At block 330, ongoing emails received from that sender/sender organization are compared with stored email characteristics. At block 340, any of the ongoing emails received from sender/sender organizations are declared as phishing based on the outcome of the comparison.

Figure 2:
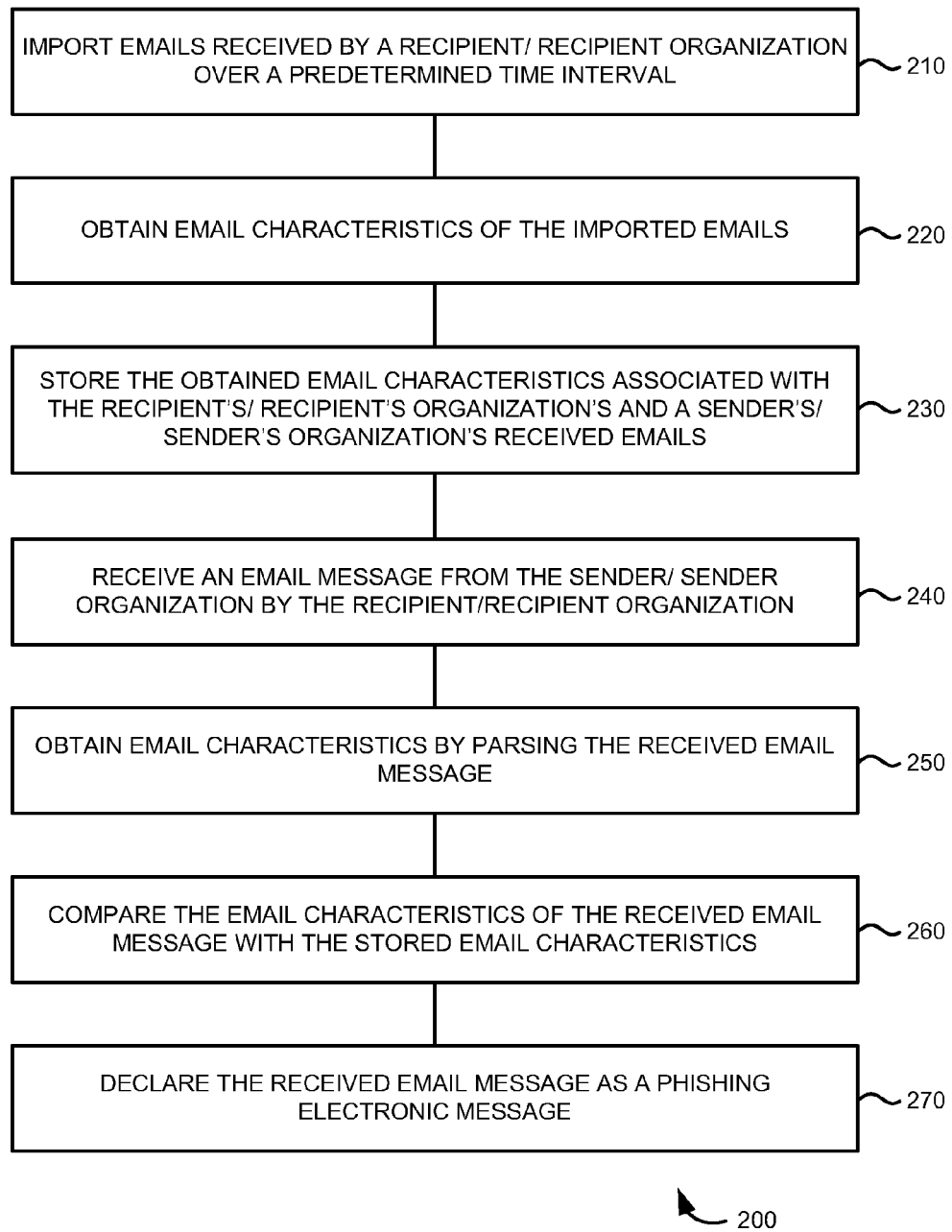
FIG. 2 illustrates a flow diagram of an exemplary method for analyzing electronic messages for phishing detection, such as those shown in FIG. 1.
Figure 3:
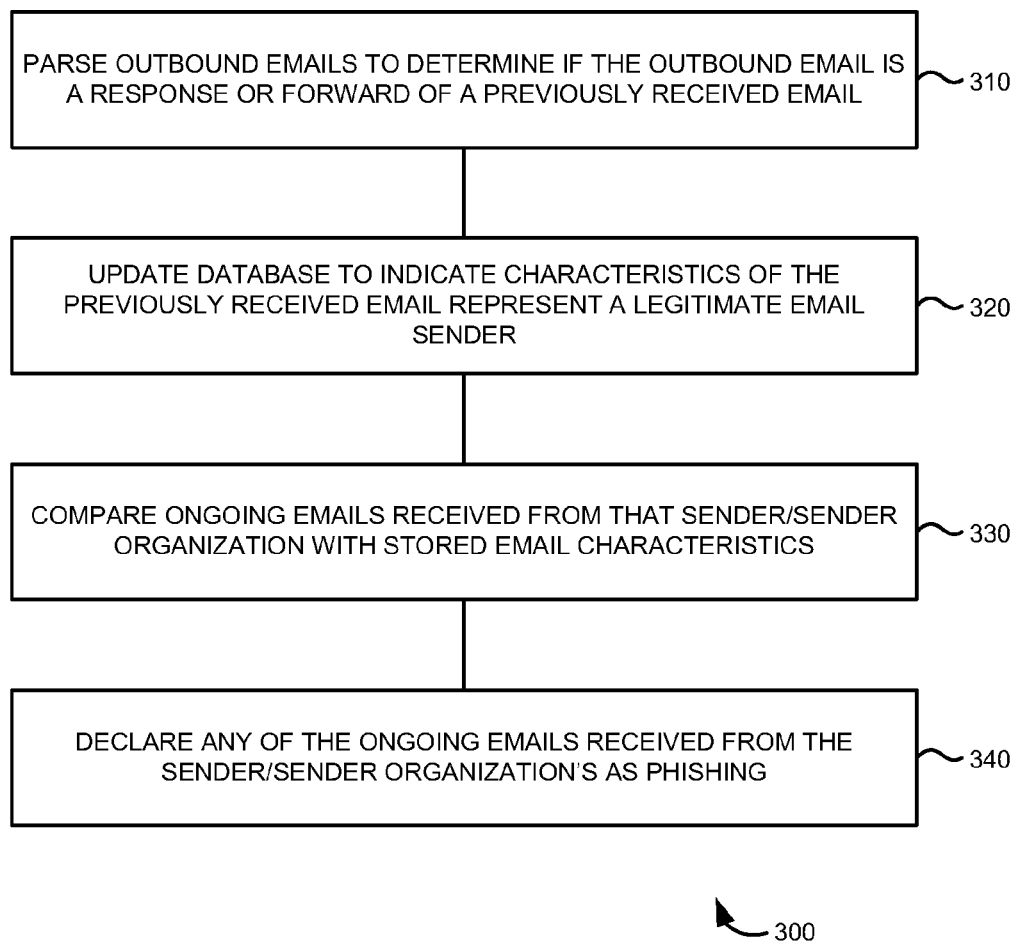
FIG. 3 illustrates another flow diagram of an exemplary method for analyzing electronic messages for phishing detection, such as those shown in FIG. 1.

In various examples, system and method described in FIGS. 1-3 propose techniques for carrying out analysis of electronic message for phishing detection. The technique enables to the addition of an indicator to emails to visually indicate to users that an email may be a phishing attempt. Additionally, the technique notifies an organization's computer system administrators regarding any synchronized attacks targeting multiple of their users by identifying any found patterns in incoming emails. Furthermore, the technique alerts an organization's computer system administrators about any possible security compromises that may result in phishing attacks within the organization. In addition, the technique assists in determining any coordinated phishing attacks against an organization by determining phishing attacks with similar characteristics against multiple users of that organization. In addition, the technique, as described in above, uses an outbound email reply as a trust factor for the sender/sender organization of the original email in determining the phishing nature of a received email from the sender/sender organization. Also, the above technique uses changing patterns of outbound emails to help determine whether an email client has been compromised and a sender/sender organization is sending any phishing email. Moreover, the above technique allows users to specify an email as a phishing attempt or a legitimate email and use the characteristics of the flagged email to filter messages to other uses at that organization.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A server implemented method for analyzing electronic messages for phishing detection, comprising:
   receiving, by the server, an email message by a recipient/recipient organization from a sender/sender organization;
   obtaining, by the server, email characteristics by parsing the received email message based on a set of predetermined email characteristics;
   comparing, by the server, the email characteristics of the received email message with the email characteristics associated with the recipient/recipient organization, and/or the sender/sender organization;
   declaring, by the server, the received email message by the recipient/recipient organization as a phishing electronic message based on the outcome of the comparison;
   wherein the email characteristics are selected from the group consisting of network path used to reach a recipient/recipient organization, geography associated with IP address, email client software used by the sender/sender organization, email client software version used by the sender/sender organization, date, day of week, time, time period of the email, time zone of the sender/sender organization, presence and details of digital signatures in the email, meta data present in header portion of the email, character set used in content of the email, format of the email, email length and subject length, character case of the email, character case of the subject, style of introduction at the top of the email, style and content of the sender/sender organization's signature in the body of the email, other recipient/recipient organizations included in the email, to, and copy circulated (cc'd) email addresses, sender/sender organizations name, sender/sender organizations from and reply to email address, senders organization name, senders domain name, sender's organization's Domain Name Service (DNS) settings including SPF records, sender organization's mail server information, including server ip address, sender/sender organization server network path, sender/sender organization email server software and software version. DKIM signature, spam scoring from spam software, message ID, volume of email sent by the sender/sender organization, volume of email sent by sender's organization, volume of email received by the recipient, volume of email received by recipient organization, details associated with URLs or attachments in the email, whether the recipient/recipient organization has responded to this specific email, and number of interactions between sender and recipient associated with the email and the like; and
   allowing an administrator to select desired email characteristics to be included in the set of characteristics used for comparing the characteristics of the received email message and to assign a weight of how much each characteristic should influence the likelihood that a new message is a phishing message.

2. The method of claim 1, further comprising:
   importing emails received by the recipient/recipient organization over a predetermined time interval;
   obtaining email characteristics of the imported emails by parsing the recipient/recipient organization's received emails based on the set of predetermined email characteristics; and
   storing the obtained email characteristics associated with the recipient/recipient organization's and the sender/sender organization's received emails in a database.

3. The method of claim 1, wherein comparing the email characteristics of the received email message with stored email characteristics associated with the recipient/recipient organization and/or the sender/sender organization, comprises:
   obtaining a statistical distribution of each of the stored email characteristics associated with the recipient/recipient organization and/or sender/sender organization; and
   comparing the email characteristics of the received email message with the obtained statistical distribution of prior email characteristics associated with the recipient/recipient organization and/or sender/sender organization.

4. The method of claim 3, further comprising:
determining degree of variance of each email characteristic when compared with the associated statistical distribution;
establishing a score based on the determined degree of variance for each email characteristic;
assigning weights for each established score based on the determined degree of variance; and
obtaining a combined score by adding scores of all the email characteristics in the received email based on the assigned weights.

5. The method of claim 1, further comprising:
storing logs of received emails and any associated phishing activity along with details of why the email was determined to be a phishing email; and
outputting the logs of the received emails and any associated phishing activity for viewing on a display device.

6. The method of claim 1, further comprising:
quarantining emails determined to be phishing emails;
forwarding quarantined emails to certain users;
adding certain text to the header or subject of quarantined emails to mark them as suspect; and
outputting quarantined emails for viewing on a display device.

7. The method of claim 1, further comprising:
parsing outbound emails sent by the recipient/recipient organization based on a set of predetermined email characteristics to determine if the outbound email is a response or forward of a previously received email by the recipient/recipient organization;
updating the database based on the above determination to indicate that the characteristics of the previously received email are more likely to represent a legitimate sender/sender organization;
comparing ongoing emails received from the sender/sender organization with stored email characteristics; and
declaring any of the ongoing emails received from the sender/sender organizations as phishing based on the outcome of the comparison.

8. The method of claim 1, further comprising:
including visual identifications and reasoning information to the received email based on the outcome of the comparison to assist the recipient/recipient organization of the nature of the received email.

9. The method of claim 1, further comprising:
determining coordinated phishing attacks against an organization by spotting phishing attacks having similar characteristics against multiple users in the organization.

10. The method of claim 1, further comprising:
monitoring changing patterns of outbound emails to determine whether an email client has been compromised and the sender/sender organization is sending a phishing email.

11. The method of claim 1, further comprising:
allowing users to specify an email as a phishing attempt and use the characteristics of this flagged email to filter messages to other users in the organization.

12. A server implemented method for analyzing electronic messages for phishing detection comprising:
receiving, by the server, an email message by a recipient/recipient organization from a sender/sender organization;
obtaining, by the server, email characteristics by parsing the received email message based on a set of predetermined email characteristics;
comparing, by the server the email characteristics of the received email message with the email characteristics associated with the recipient/recipient organization, and/or the sender/sender organization;
declaring, by the server, the received email message by the recipient/recipient organization as a phishing electronic message based on the outcome of the comparison;
obtaining contact and background information associated with an email recipient/recipient organization from the recipient's/recipient organizations' online social networks;
storing the contact and background information in the database;
upon receiving an email, determining whether the contact and background information in the received email is correct using the stored contact and background information; and
using outcome of determination as a factor in declaring the received email as a phishing email.

13. The method of claim 12 further comprising:
importing emails received by the recipient/recipient organization over a predetermined time interval;
obtaining email characteristics of the imported emails by parsing the recipient/recipient organization's received emails based on the set of predetermined email characteristics; and
storing the obtained email characteristics associated with the recipient/recipient organization's and the sender/sender organization's received emails in a database.

14. The method of claim 12 wherein comparing the email characteristics of the received email message with stored email characteristics associated with the recipient/recipient organization and/or the sender/sender organization, comprises:
obtaining a statistical distribution of each of the stored email characteristics associated with the recipient/recipient organization and/or sender/sender organization; and
comparing the email characteristics of the received email message with the obtained statistical distribution of prior email characteristics associated with the recipient/recipient organization and/or sender/sender organization.

15. The method of claim 12 further comprising:
parsing outbound emails sent by the recipient/recipient organization based on a set of predetermined email characteristics to determine if the outbound email is a response or forward of a previously received email by the recipient/recipient organization;
updating the database based on the above determination to indicate that the characteristics of the previously received email are more likely to represent a legitimate sender/sender organization;
comparing ongoing emails received from the sender/sender organization with stored email characteristics; and
declaring any of the ongoing emails received from the sender/sender organizations as phishing based on the outcome of the comparison.

16. A system for analyzing electronic messages for phishing detection, comprising:
one or more recipient's/recipient organization's email servers;
one or more sender's email clients;
one or more recipient's email clients;
Intranet or Internet;
a database; and one or more anti-phishing servers coupled to the database, and further the one or more anti-phishing servers coupled to the one or more recipient's/recipient's organization's email servers, the one or more sender's email clients, and/or the one or more recipient's email clients via Internet or Intranet, wherein the email client plugin module attaches to one or more recipient's email clients and wherein the anti-phishing server comprises:

a processor; and a memory coupled to the processor, wherein the memory comprising a anti-phishing module, wherein the anti-phishing module comprises an import module, an analysis and data warehouse module, a mail handler module, an organizational analysis module, an outbound mail relay module, a configuration and management module that are configured to:

receiving an email message from one or more sender/sender organizations by one or more recipients/recipient's organization via the mail handler module;

obtaining email characteristics by parsing the received email message based on a set of predetermined email characteristics by the analysis and data warehouse module;

comparing the email characteristics of the received email message with email characteristics associated with the recipient/recipient organization and/or that sender/sender organization by the analysis and data warehouse module; and declaring the received email message by the recipient/recipient organization as a phishing electronic message based on the outcome of the comparison by the analysis and data warehouse module;

wherein the email characteristics are selected from the group consisting of network path used to reach a recipient/recipient organization, geography associated with IP address, email client software used by the sender/sender organization, email client software version used by the sender/sender organization, date, day of week, time, time period of the email, time zone of the sender/sender organization, presence and details of digital signatures in the email, meta data present in header portion of the email, character set used in content of the email, format of the email, email length and subject length, character case of the email, character case of the subject, style of introduction at the top of the email, style and content of the sender/sender organization's signature in the body of the email, other recipient/recipient organizations included in the email, to, and copy circulated (cc'd) email addresses, sender/sender organizations name, sender/sender organizations from and reply to email address, senders organization name, senders domain name, sender's organization's Domain Name Service (DNS) settings including SPF records, sender organization's mail server information, including server ip address, sender/sender organization server network path, sender/sender organization email server software and software version, DKIM signature, spam scoring from spam software, message ID, volume of email sent by the sender/sender organization, volume of email sent by sender's organization, volume of email received by the recipient, volume of email received by recipient organization, details associated with URLs or attachments in the email, whether the recipient/recipient organization has responded to this specific email, and number of interactions between sender and recipient associated with the email and the like; and wherein the configuration and management module allows an administrator to select desired email characteristics to be included in the set of characteristics used for comparing the characteristics of the received email message and to assign a weight of how much each characteristic should influence the likelihood that a new message is a phishing message.

17. The system of claim 16, wherein either the import module or the email client plugin module directly imports emails received by the recipient/recipient organization over a predetermined time interval, wherein the analysis and data warehouse module parses the recipient/recipient organization's received emails based on the set of predetermined email characteristics to obtain email characteristics of the imported emails, and wherein the analysis and data warehouse module stores the obtained email characteristics associated with the recipient/recipient organization's and/or sender/sender organization's received email in the database.

18. The system of claim 16, wherein the analysis and data warehouse module obtains a statistical distribution of each of the stored email characteristics associated with the recipient/recipient organization and/or the sender/sender organization, and wherein the analysis and data warehouse module compares the email characteristics of the received email message with the obtain statistical distribution of prior email characteristics associated with the recipient/recipient organization and/or sender/sender organization.

19. The system of claim 18, wherein the analysis and data warehouse module determines degree of variance of each email characteristic when compared with the associated statistical distribution, wherein the analysis and data warehouse module establishes a score based on the determined degree of variance for each email characteristic, wherein the analysis and data warehouse module assigns weights for each established score based on the determined degree of variance, and wherein the analysis and data warehouse module obtains a combined score by adding scores of all the email characteristics in the received email based on the assigned weights.

20. The system of claim 16, wherein the analysis and data warehouse module stores logs of received emails and any associated phishing activity along with details of why the email was determined to be a phishing email in the database, and wherein the configuration and management module outputs the logs of the received emails and any associated phishing activity for viewing on a display device.

21. The system of claim 16, wherein the mail handler module quarantines emails determined to be phishing emails, wherein the configuration and management module forwards quarantined emails to certain users, wherein the configuration and management module adds certain text to the header or subject of quarantined emails to mark them as suspect, and wherein the configuration and management module outputs the quarantined emails for viewing on a display device.

22. The system of claim 16, wherein either the email client plugin module or the outbound mail relay module parses outbound emails sent by the recipient/recipients' organization based on a set of predetermined email characteristics to determine if the outbound email is a response or forward of a previously received email by the recipient/recipient organization, wherein the analysis and data warehouse module updates the database based on the above determination to indicate that the characteristics of the previously received email are more likely to represent a legitimate sender/sender organization, wherein the analysis and data warehouse module compares ongoing emails received from the sender/sender organizations with stored email characteristics, and wherein the analysis and data warehouse module declares any of the ongoing emails received from the sender/sender organizations as phishing based on the outcome of the comparison.

23. The system of claim 16, wherein the mail handler module along with the email client plugin module includes visual identifications and reasoning information to the received email based on the outcome of the comparison to assist the recipient/recipient organization of the nature of the received email.

24. The system of claim 16, wherein the analysis and data warehouse module determines coordinated phishing attacks against an organization by spotting phishing attacks having similar characteristics against multiple users in the organization.

25. The system of claim 16, wherein the organization analysis module monitors changing patterns of outbound emails to determine whether an email client has been compromised and the sender/sender organization is sending a phishing email.

26. The system of claim 16, wherein either the email client plugin module or the configuration and management module allows users to specify an email as a phishing attempt and use the characteristics of this flagged email to filter messages to other users in the organization.

27. A system for analyzing electronic messages for phishing detection, comprising:
   one or more recipient's/recipient organization's email servers;
   one or more sender's email clients:
   one or more recipient's email clients;
   Intranet or Internet;
   a database; and
   one or more anti-phishing servers coupled to the database, and further the one or more anti-phishing servers coupled to the one or more recipient's/recipient's organization's email servers, the one or more sender's email clients, and/or the one or more recipient's email clients via Internet or Intranet, wherein the email client plugin module attaches to one or more recipient's email clients and wherein the anti-phishing server comprises:
   a processor; and
   a memory coupled to the processor, wherein the memory comprising a anti-phishing module, wherein the anti-phishing module comprises an import module, an analysis and data warehouse module, a mail handler module, an organizational analysis module, an outbound mail relay module, a configuration and management module that are configured to:
   receiving an email message from one or more sender/sender organizations by one or more recipients/recipient's organization via the mail handler module;
   obtaining email characteristics by parsing the received email message based on a set of predetermined email characteristics by the analysis and data warehouse module;
   comparing the email characteristics of the received email message with email characteristics associated with the recipient/recipient organization and/or that sender/sender organization by the analysis and data warehouse module;
   declaring the received email message by the recipient/recipient organization as a phishing electronic message based on the outcome of the comparison by the analysis and data warehouse module; and
   wherein the email client plugin module along with the configuration and management module obtains contact and background information associated with an email recipient from the recipient's online social networks, wherein analysis and data warehouse module stores the contact and background information in the database, wherein the analysis and data ware house module, upon receiving an email, determines whether the contact and background information in the received email is correct using the stored contact and background information, and wherein analysis and data warehouse module uses the outcome of the above determination as a factor in declaring the received email as phishing email.

28. The system of claim 27 wherein either the import module or the email client plugin module directly imports emails received by the recipient/recipient organization over a predetermined time interval, wherein the analysis and data warehouse module parses the recipient/recipient organization's received emails based on the set of predetermined email characteristics to obtain email characteristics of the imported emails, and wherein the analysis and data warehouse module stores the obtained email characteristics associated with the recipient/recipient organization's and/or sender/sender organization's received email in the database.

29. The system of claim 27 wherein the analysis and data warehouse module obtains a statistical distribution of each of the stored email characteristics associated with the recipient/recipient organization and/or the sender/sender organization, and wherein the analysis and data warehouse module compares the email characteristics of the received email message with the obtain statistical distribution of prior email characteristics associated with the recipient/recipient organization and/or sender/sender organization.

30. The system of claim 27 wherein either the email client plugin module or the outbound mail relay module parses outbound emails sent by the recipient/recipients' organization based on a set of predetermined email characteristics to determine if the outbound email is a response or forward of a previously received email by the recipient/recipient organization, wherein the analysis and data warehouse module updates the database based on the above determination to indicate that the characteristics of the previously received email are more likely to represent a legitimate sender/sender organization, wherein the analysis and data warehouse module compares ongoing emails received from the sender/sender organizations with stored email characteristics, and wherein the analysis and data warehouse module declares any of the ongoing emails received from the sender/sender organizations as phishing based on the outcome of the comparison.

* * * * *